United States Patent [19]

Halwes

[11] 4,365,771
[45] Dec. 28, 1982

[54] INPLANE NODALIZATION SYSTEM

[75] Inventor: Dennis R. Halwes, Arlington, Tex.

[73] Assignee: Textron, Inc., Providence, R.I.

[21] Appl. No.: 246,295

[22] Filed: Mar. 23, 1981

Related U.S. Application Data

[63] Continuation of Ser. No. 15,229, Feb. 26, 1979, abandoned.

[51] Int. Cl.³ .................. B64C 27/00; F16F 15/10
[52] U.S. Cl. ..................... 244/17.27; 188/378; 248/554; 248/638
[58] Field of Search .......... 244/17.11, 17.21, 54; 188/378–380; 267/57.1 R, 140, 141, 63 A, 35; 248/554–557, 561–567, 596, 599, 603, 611, 613, 632, 638; 74/574, 586; 416/500, 244 R, 134

[56] References Cited

U.S. PATENT DOCUMENTS

| | | | |
|---|---|---|---|
| 2,540,130 | 2/1951 | Lee | 248/562 |
| 2,615,657 | 10/1952 | Young et al. | 244/17.27 |
| 2,907,281 | 10/1959 | Moulton et al. | 267/57.1 R |
| 3,163,378 | 12/1964 | Balke et al. | 244/17.27 |
| 3,171,622 | 3/1965 | Tolan, Jr. | 267/63 A |
| 3,625,466 | 12/1971 | Marshal et al. | 188/380 |
| 3,845,917 | 11/1974 | Drees | 244/17.27 |
| 3,857,534 | 12/1974 | Drees et al. | 244/17.27 |
| 3,858,831 | 1/1975 | Halwes | 244/17.27 |
| 3,945,628 | 3/1976 | Halwes | 244/17.27 |
| 4,088,042 | 5/1978 | Desjardin et al. | 244/17.27 |
| 4,140,028 | 2/1979 | Desjardins | 244/17.27 |

FOREIGN PATENT DOCUMENTS 1380710 1/1975 United Kingdom ............ 244/17.27

Primary Examiner—Galen L. Barefoot
Attorney, Agent, or Firm—Richards, Harris & Medlock

[57] ABSTRACT

A helicopter transmission mounting structure is disclosed in which at least three decoupled inertial isolators (26,38,30,32) are connected to the transmission (12) to support the helicopter fuselage. Each of the inertial isolators (26,28,30,32) is mounted in the nodal plane of the transmission (12) to absorb inplane vibrations generated by a rotor blade and transmitted through a rotor mast (10). The inertial isolators (26,28,30,32) respond individually to applied vibrations which have predetermined frequencies and generate counteracting forces to reduce the amplitude of vibrations transmitted to the fuselage. In an alternative embodiment beam input links (134,136,138,140) are connected from the nodal plane of the transmission to inertial isolators (142,144,146,148). The beam input links (134,136,138,140) are connected to transmit only those forces parallel to the rotor mast (10).

5 Claims, 8 Drawing Figures

INPLANE NODALIZATION SYSTEM

This is a continuation of application Ser. No. 015,229, filed Feb. 26, 1979, now abandoned.

TECHNICAL FIELD

This invention relates to vibration isolation in rotary winged aircraft and more particularly to structure providing inertial isolation by means of counterforce oscillation.

BACKGROUND ART

Vibration is a serious problem in helicopters. The action of the rotor blades and the air loading on the blades generate vibration forces which are oriented both vertically and in the plane of the rotor disc. Both types of vibrations are transmitted through the rotor pylon to the helicopter transmission where the vibrations are passed on to the helicopter fuselage. Vibration of the fuselage has been reduced by use of nodal point isolators. A number of nodal point isolation systems have been developed to reduce such vibration. These vibration suppression devices are disclosed in U.S. Pat. No. 3,845,917 to Drees, U.S. Pat. No. 3,857,534 to Drees et. al. and U.S. Pat. Nos. 3,858,831 and 3,945,628 to Halwes. The devices disclosed in these patents however, provide isolation for no more than three degrees of freedom.

There exists a need for a vibration suppression system which provides isolation for as many as five degrees of freedom to reduce inplane as well as vertical vibrations which are generated in the rotor pylon and transmitted to the fuselage through the transmission.

DISCLOSURE OF THE INVENTION

A mount is provided for a helicopter transmission for isolating the fuselage from rotor-induced vibrations. At least three inertial isolaters, each decoupled from the other, support the fuselage from the transmission. Each inertial isolator is connected at the nodal plane of the transmission for reducing inplane vibrations transmitted through the rotor mast. The inertial isolators absorb vertical vibrations as well.

In an alternative embodiment, decoupled inertial isolators are mounted in a position offset vertically from the transmission nodal plane. The isolators are connected to the transmission through vertically beam input links and are connected to the transmission at the nodal plane thereof, the beam input links transmitting only vertically oriented vibration forces.

BRIEF DESCRIPTION OF DRAWINGS

For a more complete understanding of the present invention and the advantages thereof, reference is now made to the following description taken in conjunction with the accompanying drawings in which.

DETAILED DESCRIPTION

Figure 1:
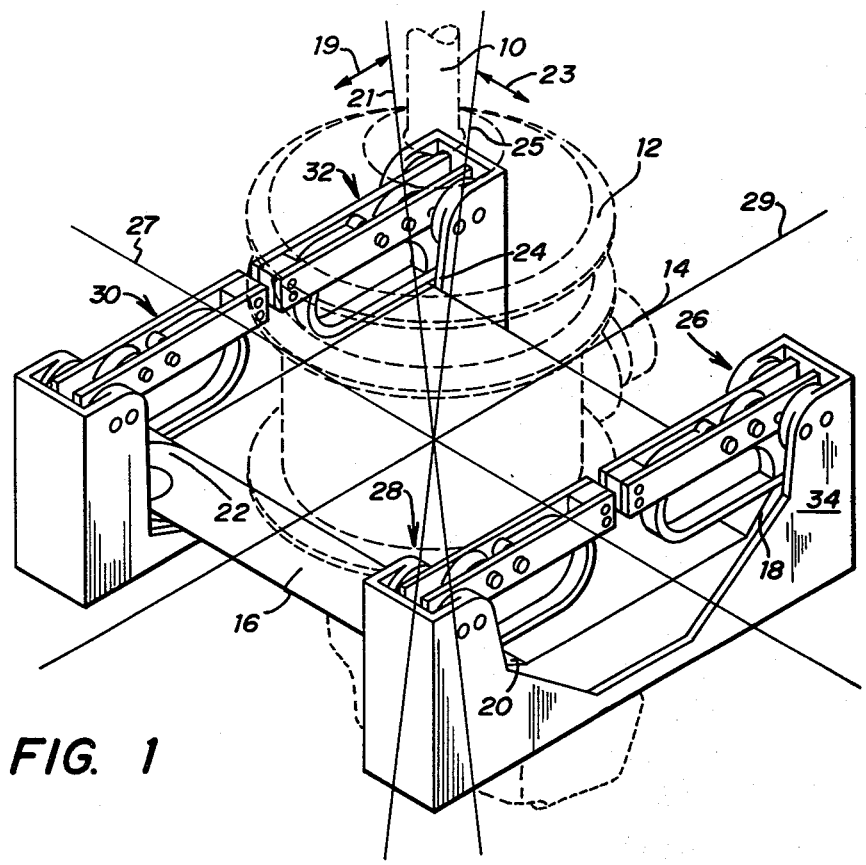
FIG. 1 is a perspective view of a helicopter transmission mount connected to support the helicopter fuselage through a plurality of inertial isolators positioned in the transmission nodal plane.

Referring to FIG. 1, there is illustrated a helicopter rotor mast 10 extending upward from a drive transmission 12. A power input shaft 14 drives the mast 10 through the transmission 12.

A lower transmission case 16 is joined to the transmission 12 and includes mounting lugs 18, 20, 22 and 24. The mounting lugs are connected respectively to inertial isolators 26, 28, 30, and 32.

Inplane vibrational forces generated in the helicopter rotor (not shown) cause mast 10 to vibrate in the fore and aft direction as shown by arrow 19 and line 21 and transversely as shown by arrow 23 and line 25. The fore and aft vibrations cause the transmission 12 to oscillate about line 27 while the transverse vibrations cause the transmission 12 to oscillate about line 29. Lines 27 and 29 together define the nodal plane of transmission 12. The location of the nodal plane is a function of the frequency of the inplane vibrations.

Figure 2:
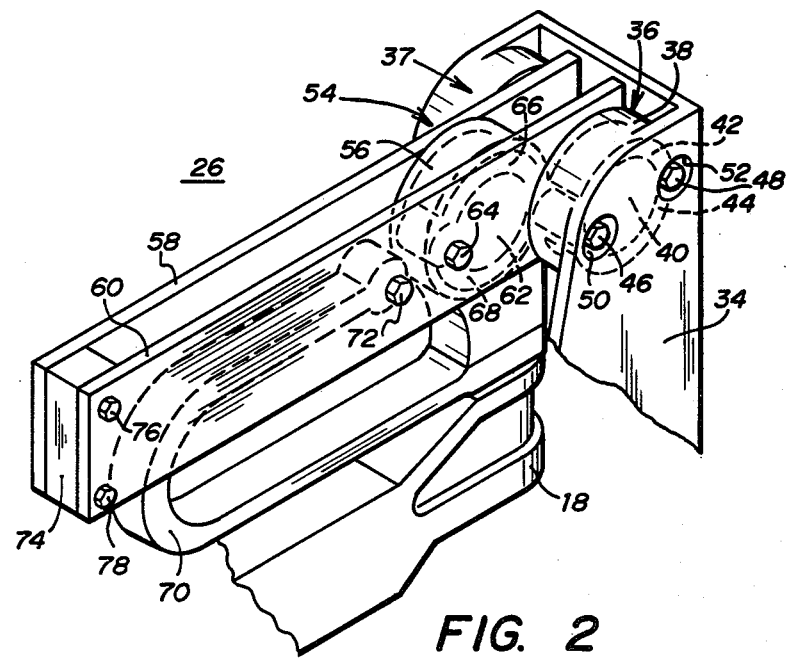
FIG. 2 is a perspective view of an inertial isolator utilized with the present invention and as shown in FIG. 1.

Referring to FIGS. 1 and 2, inertial isolator 26, which is representative of the remaining inertial isolators 28, 30 and 32, is connected at its base to the mounting lug 18 and on either side to a fuselage mount 34. The inertial isolator 26 is connected to the fuselage mount 34 through elastomeric bearings 36 and 37. A bearing housing 38 of bearing 36 is rigidly joined to the fuselage mount 34. A bearing core 40 of the elastomeric bearing 36 is spaced within and apart from the bearing housing 38 by upper and lower elastomeric members 42 and 44.

Bolts 46 and 48 pass through holes 50 and 52 in fuselage mount 34 and are rotatably connected to bearing core 40. The holes 50 and 52 are enlarged so that the bolts 46 and 48 can move to a limited extent without striking the fuselage mount 34.

The inertial isolator 26 includes a third elastomeric bearing 54 having a bearing housing 56 which is rigidly connected to the mounting lug 18. Within bearing 54 a bearing core 62 is rotatably connected to bolts 46 and 64. Bolt 64 passes through beam arms 58 and 60. Upper and lower elastomeric members 66 and 68 are disposed between the bearing housing 56 and the bearing core 62 for absorbing forces transmitted between these two members, while allowing limited rotation of bearing core 62 relative to the bearing house 56.

A leaf spring 70 is rigidly connected at one end to the bearing housing 56 and the transmission mounting lug 18. The other end of leaf spring 70 is rotatably connected to the beam arms 58 and 60 by means of a bolt 72.

A tuning weight 74 is rigidly joined to the beam arms 58 and 60 by bolts 76 and 78.

Figure 3:
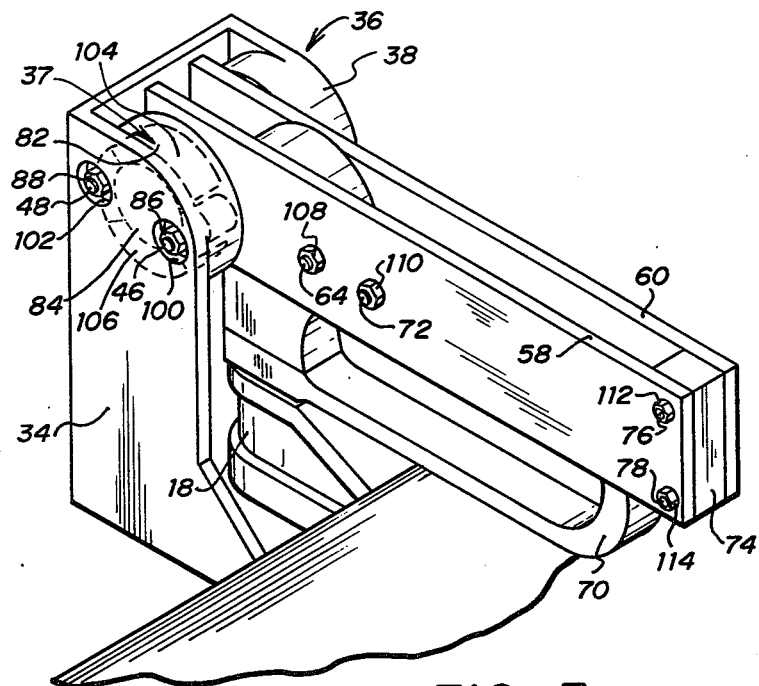
FIG. 3 is a perspective view of the reverse side of the inertial isolator shown in FIG. 2.

Referring now to FIGS. 2 and 3 wherein FIG. 3 illustrates the inertial isolator 26 viewed from a rear quarter. The elastomeric bearing 37 has a bearing housing 82 with a bearing core 84. The bearing housing 82 is rigidly connected to the fuselage mount 34. Bearing core 84 is secured to bolts 46 and 48 by nuts 86 and 88. Bolts 46 and 48 pass through enlarged holes 100 and 102 within the wall of the fuselage mount 34 where the holes permit limited movement of the bolts therein. Upper and lower elastomeric members 104 and 106 are disposed between the bearing core 84 and the bearing housing 82 for absorbing forces transmitted between these two members, while allowing the core limited freedom to rotate relative to the housing.

Bolts 64, 72, 76 and 78 which pass through the beam arms 58 and 60 are secured to the nuts 108, 110, 112, and 114, respectively.

When the isolator 26 is oscillating the movement of the beam arms 58 and 60 is about the axis of the bearings 36 and 37. This axis constitutes the center line of the inertial isolator. Each of the inertial isolators 26, 28, 30 and 32 is mounted so the center line of the isolator is in the nodal plane of the transmission, where the nodal plane is defined by lines 27 and 29.

Operation of the inertial isolator 26 is described in reference to FIGS. 1, 2, 3 and 4. The vibrations that are transmitted from the rotor blade (not shown) through the mast 10 and transmission 12 are transferred as vertical forces to the inertial isolators 26, 28, 30 and 32. The forces generated in the rotor blade are oriented both in the plane of the rotor disc and parallel to the axis of the mast 10. By mounting the inertial isolators so that the isolators react the vibrational loading effective in the transmission nodal plane, all of the loads become vertical inputs to the isolators. The vertical forces transmitted from the rotor blade sum to move the inertial isolators in the same direction, while the inplane forces transmitted from the rotor sum to move the inertial isolators in opposite directions on opposite sides of the transmission. In each case the forces from the blade are transmitted to the inertial isolators as vertical forces. Thus, each isolator acts only in response to vertically imposed forces.

Figure 4:
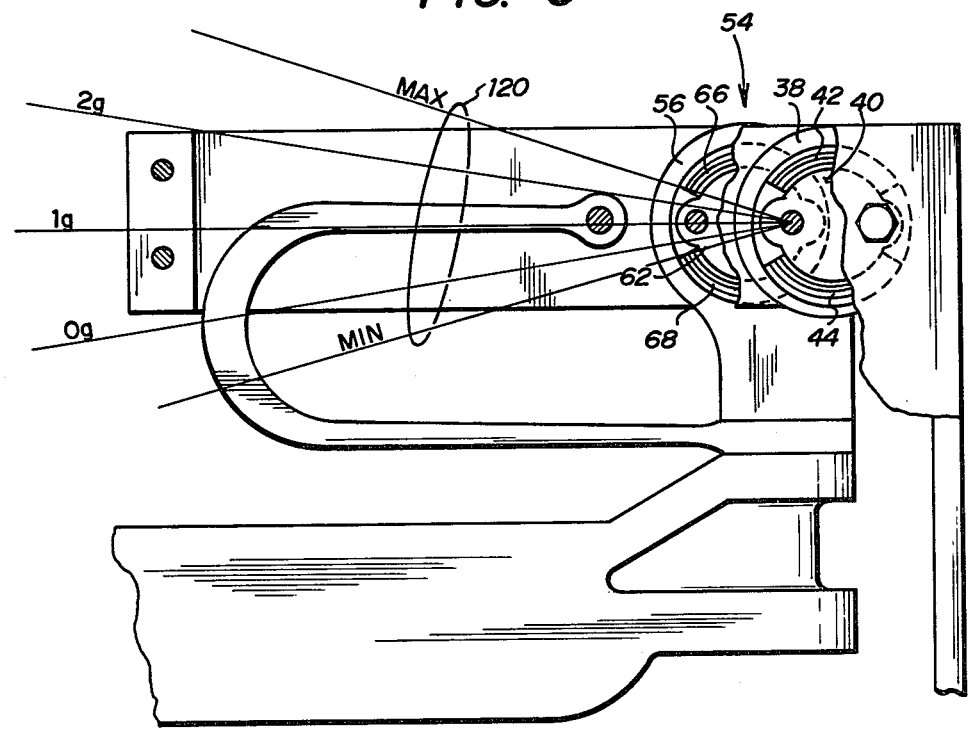
FIG. 4 is an elevation view of the inertial isolator shown in FIGS. 2 and 3.

The forces from the rotor blades are transmitted through the lower transmission case 16 and the transmission lug 18 to the bottom of the leaf spring 70 and the bearing housing 56 of the elastomeric bearing 54. These forces cause the assembly comprising the elastomeric bearing 54 along with the beam arms 58 and 60 and the tuning weight 74 to pivot about the center of the elastomeric bearings 36 and 37. The pivoting of the beam arms 58 and 60 about the axis of the elastomeric bearings 36 and 37 is illustrated by the lines 120 in FIG. 4 showing the deflection resulting from the application of the vibration forces to the inertial isolator. The beam arms 58 and 60 are at rest as shown with a loading of one gravity (g) and are deflected to the extent shown under force conditions of 0 g, 2 g and predetermined minimum and maximum loadings dependent upon the load carrying ability of the various components.

The position of the axis of oscillation of the beam arms 58 and 60 is determined by a plurality of factors including the frequency of the induced vibrations, the spring constant of the leaf spring 70 and the combined weight of the oscillating components comprising beam arms 58 and 60, tuning weight 74 and leaf spring 70. The combination of these factors together determines the location of the pivot axis of the inertial isolator 26. The mass of the tuning weight 74 is varied to set the pivot axis at the center of bearings 36 and 37, the axis of the attachment to the fuselage.

The primary vibration to be isolated is at a frequency of two per rotor revolution, and since the helicopter rotor generally rotates at a constant rate the frequency of the vibrations to be suppressed can be predicted. The inertial isolator 26 is tuned to have a pivot axis such that the center of the elastomeric bearings 36 and 37 remains in a relatively fixed position while the beam arms 58 and 60 vibrate. The axis of the elastomeric bearings 36 and 37 corresponds to the pivot axis of the inertial isolator 26. Since the fuselage mount 34 is rigidly connected to the bearing housings 38 and 82, the fuselage of the aircraft will vibrate less than the rotor, mast, transmission and beam arms of the inertial isolators which will vibrate at the frequency of the rotor-induced vibrations. This substantially reduces the magnitude of vibrations passed from the rotor to the helicopter fuselage.

The inertial isolators 26, 28, 30 and 32 are vibrationally decoupled and are free to vibrate independently in phase and magnitude. Vibrations in the plane of the rotor disc act as moments about lines 27 and 29 passing through transmission 12 and transmit vertical forces in opposite directions to opposed inertial isolators. Since the isolators are decoupled, each responds individually to the applied vibrations. This is in contrast to prior art inertial systems in which one or two nodalized isolation beams were utilized and inplane vibrations could not be damped because the isolators were interconnected. With decoupling as few as three inertial isolators spaced uniformly about the transmission can dampen vibrations from the rotor. The vibrations which are damped are in five degrees of freedom which are vertical, pitch, roll, fore-aft and lateral. Previous inertial isolation systems have been able to damp vibrations only in vertical, pitch and roll freedoms.

Figure 5:
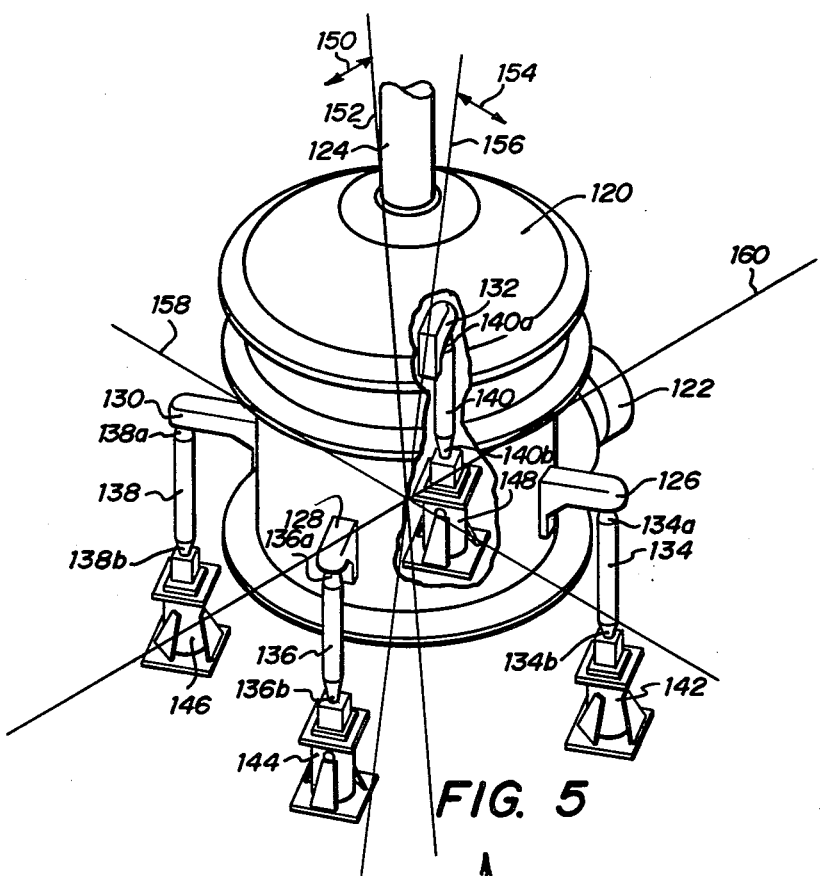
FIG. 5 is a perspective view of a helicopter transmission mount connected to support the helicopter fuselage through a plurality of inertial isolators positioned offset from the nodal plane of the transmission.

A further embodiment of the present invention is illustrated in FIG. 5. A transmission 120 has a drive shaft 122 and a vertically extending mast 124 for driving a rotor (not shown). A set of transmission lugs 126–132 are spaced uniformly about the center of transmission 120. Each of the lugs is connected to a respective beam link 134–140 by means of rotary joints 134a–140a. The lower ends of each of the links is connected by means of rotary joints 134b–140b to inertial isolators 142–148 respectively. The base of each inertial isolator is connected to support the helicopter fuselage. Inertial isolators 142–148 are described in further detail below.

The helicopter rotor generates inplane forces which act on the mast 124 causing it to vibrate in the fore and aft direction as shown by arrow 150 and line 152 and to vibrate in the transverse direction as shown by arrow 154 and line 156. The fore and aft oscillation of the mast 124 causes the transmission 120 to oscillate about an axis shown as line 158 while the transverse vibration of mast 124 causes the transmission to oscillate about an axis shown as line 160. Line 158 together with line 160 defines the nodal plane of transmission 120. As described above, the location of the nodal plane is a function of the frequency of the induced vibrations, but since the vibrations are a function of the rotor speed and the rotor speed is generally held constant, the position of the nodal plane can be easily determined.

The transmission lugs 126–132 are positioned on the transmission 120 so that the centers of the rotary joints 134a–140a of the links 134–140 are in the nodal plane of the transmission. Since each of the links has a rotary joint at both ends, the links can transmit only longitudinal forces. Further, the links are mounted normal to the nodal plane of the transmission and can therefore carry only those forces normal to the transmission nodal plane. These beam links enable the embodiment of the present invention shown in FIG. 5 to function in the same manner as that described for the embodiment shown in FIG. 1 but with the added advantage that the inertial isolators 142-148 are free to be positioned in a location other than in the nodal plane of the transmission. This freedom makes possible the design of a transmission mount which is more compact and lighter than existing models. Further, the versatility of placing the inertial isolator outside the transmission nodal plane makes possible novel and improved configurations of helicopter lift units.

Figure 6:
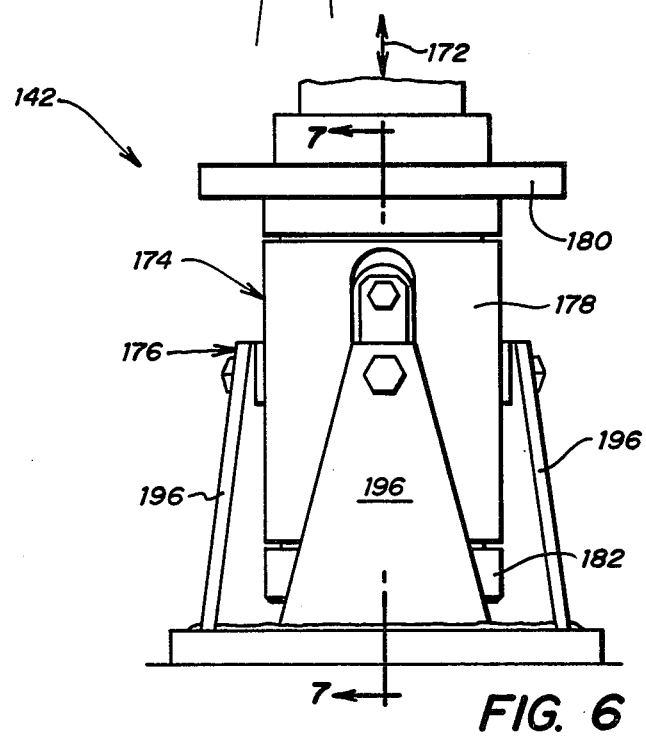
FIG. 6 is an elevation view of the inertial isolator shown in FIG. 5.
Figure 7:
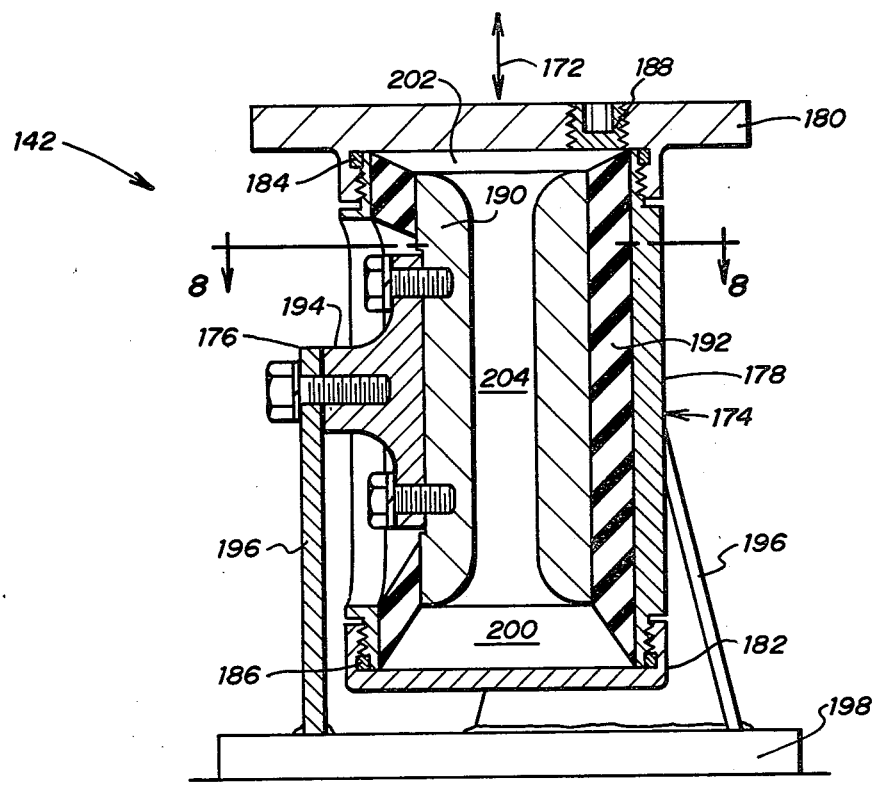
FIG. 7 is a section view taken along line 7—7 of the inertial isolator shown in FIG. 6.
Figure 8:
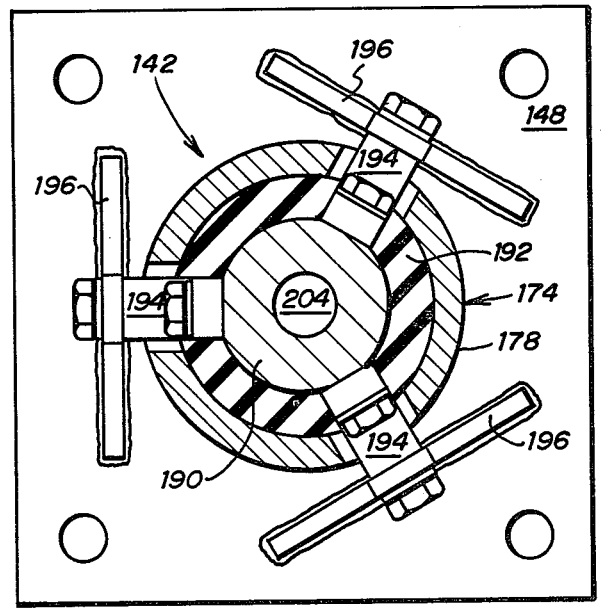
FIG. 8 is a section view taken along line 8—8 of the inertial isolator shown in FIG. 7.

Referring now to FIGS. 6-8, there is shown vibration isolator 142 which is representative of the remaining inertial isolators 144-148. The isolator 142 is adapted for connection between a vibrating body oscillating along line 172 and a body to be isolated. The vibration isolator 142 includes an outer housing 174 and an inner housing 176. In accordance with the preferred construction, the outer housing 174 is of sectionalized construction and generally cylindrical configuration. The outer housing 174 includes a central section 178 threadedly secured to end sections 180 and 182. As is best shown in FIG. 7, seals 184 and 186 of the O-ring type are provided between the sections comprising the outer housing 174 to prevent fluid leakage from the interior thereof. It will thus be understood that outer housing 174 has a hollow interior. Preferably, a removable plug, such as plug 188 in end section 180, is provided in the housing 174 for communication with the interior thereof.

The inner housing 176 is resiliently suspended within the outer housing 174. The inner housing 176 includes a tuning sleeve 190 mounted for axial movement within the outer housing 174. The tuning sleeve 190 is attached to an elastomeric spring 192 bonded between the outside surface of the sleeve and the inside surface of the central section 178 in the outer housing 174. The tuning sleeve 190 is relatively shorter than the outer housing 174 to allow axial movement within the housing. The elastomeric spring 192 functions as a return spring and seal. A plurality of lugs 194 are secured directly to the tuning sleeve 190, and extend outwardly through longitudinal openings provided in the elastomeric spring 192 and the central section 178. The lugs 194 serve as attachments for connecting the inner housing 176 either to a vibrating body or a body to be isolated from vibration. For purpose of illustration, the lugs 194 are attached to legs 196 anchored to a plate 198. The legs 196 and plate 198 thus comprise a base for attaching one of the two aforementioned bodies to the inner housing 176 of the vibration isolator 142. Although the plate 198 and thus the inner housing 176 are illustrated as connected to base or grounded structure, it will be understood that either the inner housing 16 or the outer housing 174 can be secured to a vibrating body, such that the vibration isolator 142 is reversible. Plate 198 is connected to support the helicopter fuselage while end section 180 is connected through a beam link to transmission 120.

Referring particularly to FIGS. 7 and 8, two spaced apart chambers 200 and 202 are defined inside the vibration isolator 142 between the ends of the housings 174 and 176. The chambers 200 and 202 are of substantially equal cross-sectional areas but variable volume due to movement of the inner housing 176. A central bore 204 through the tuning sleeve 190 interconnects the chambers 200 and 202. The cross-sectional area of the bore 204 is relatively less than that of chambers 200 and 202. Preferably, the ends of the bore 204 in the tuning sleeve 190 are flared as shown in FIG. 7 to facilitate fluid flow through the bore and between the chambers 200 and 202.

Significantly, the chambers 200 and 202 and bore 204 in the vibration isolator 142 are filled with a liquid tuning mass. A suitable liquid comprises a dense incompressible fluid with high surface tension and low viscosity. For example, liquid mercury has been found particularly effective. In this regard, it is noted that the rigid components of the vibration isolator 142 should be constructed of stainless steel to resist the corrosive effect of mercury. Slurries may also be used. For example, a slurry of powdered metal and hydraulic fluid can be used.

The utilization of liquid as a tuning mass within the vibration isolator 142 is both unique and significant. For conceptual purposes, the outer housing 174 can be thought of as a cylinder, and the inner housing 176 can be likened to a piston. The application of vibrationary force to the isolator 142 causes relative motion between the piston and cylinder. The volumes of the chambers 200 and 202 are alternately increased and decreased as the liquid tuning mass is pumped back and forth by and through the piston. However, there is substantially no orificing effect by the liquid moving through the bore 204 in the tuning sleeve 190 due to the low viscosity of the fluid. It will be understood that virtually no damping occurs as the liquid passes through the passage 204. The inertia of the tuning mass is amplified by the ratio of the cross sectional area of the piston to the cross sectional area of the passage (bore 204) through the piston. At some frequency, these inertial forces become equal and opposite to the force of the elastomeric spring 192 acting upon the piston, whereby cancellation occurs. The present invention thus employs acceleration and displacement at the same frequency and amplitude, but opposite phase, to absorb vibration.

The inertial isolators 26, 28, 30 and 32 shown in FIG. 1 are interchangeble with the inertial isolators 142, 144, 146 and 148 shown in FIG. 5. The configuration of the present invention shown in FIG. 1 places the center lines of the inertial isolators in the nodal plane of the transmission while the configuration shown in FIG. 5 permits offsetting the inertial isolators by use of vertical beam links which have ball joint type rotary connections at each end. The beam links are connected at the transmission in the nodal plane thereof.

Although several embodiments of the invention have been illustrated in the accompanying drawings and described in the foregoing detailed description, it will be understood that the invention is not limited to the embodiments disclosed but is capable of numerous rearrangements, modifications, and substitutions without departing from the scope of the invention.

I claim:

1. A helicopter transmission mount for providing isolation in multiple degrees of freedom to reduce in-plane and vertical vibrations existing from forces developed in the helicopter rotor and transmitted to the helicopter fuselage through the transmission, comprising in combination:

a rigid beam having a pivot axis;

first bearing means joined to said beam at a drive point thereof;

means for connecting the transmission to said first bearing means for driving said beam by the rotor induced vibrations;

second bearing means connecting the fuselage to said beam, said second bearing means coaxial with the pivot axis of said beam; and said first and second bearing means along with said rigid beam being selected to be combined to establish the pivot axis of the transmission mount at said second bearing means.

2. A helicopter transmission mount as set forth in claim 1 further including spring means connected to said beam for dampening the vertical motion imparted to the transmission mount.

3. A helicopter transmission mount as set forth in claim 1 further including a tuning weight rigidly joined to said beam, said weight having a selected mass for aligning the pivot axis of the transmission mount with the axis of said second bearing means.

4. A helicopter transmission mount as set forth in claim 1 wherein:

said first bearing means comprises a housing rigidly connected to said transmission, a core rigidly connected to said beam, and an elastomeric element disposed between said housing and said core and permitting limited movement therebetween; and said second bearing means comprising a housing connected to the fuselage, a core connected to said beam, and an elastomeric element disposed between said housing and said core for permitting limited movement therebetween.

5. A helicopter transmission mount for minimizing vibration of the helicopter fuselage due to rotor-induced vibrations comprising in combination:

a rigid beam having a pivot axis;

a first bearing means joined to said beam at a drive point thereof;

means for connecting said transmission to said first bearing at a point lying in the nodal plane of said transmission for driving said beam by said rotor-induced vibrations;

second bearing means connecting said fuselage to said beam, said second bearing means being coaxial with the pivot axis of said beam, and a third bearing means disposed on the opposite side of said beam from said second bearing means and coaxial therewith, said third bearing means connecting said fuselage to said beam.

* * * * *